United States Patent [19]
Hatch

[11] Patent Number: 5,259,686
[45] Date of Patent: Nov. 9, 1993

[54] DOWEL COATED WITH WATER SOLUBLE GLUE

[76] Inventor: J. Mel Hatch, 4850 S. Hidden Cove Cir., Murray, Utah 84123

[21] Appl. No.: 766,590

[22] Filed: Sep. 27, 1991

[51] Int. Cl.$^5$ .............................................. B25G 3/34
[52] U.S. Cl. .................................... 403/267; 403/266; 403/292; 156/293
[58] Field of Search ............... 403/292, 265, 268, 267, 403/266; 156/308.8, 324.4, 293

[56] References Cited

U.S. PATENT DOCUMENTS

| | | | |
|---|---|---|---|
| 2,817,620 | 12/1957 | Golick et al. | 403/292 X |
| 3,059,291 | 10/1962 | Sherwood | 403/292 X |
| 4,110,053 | 8/1978 | Buchholz | 403/292 X |

FOREIGN PATENT DOCUMENTS

| | | | |
|---|---|---|---|
| 246882 | 12/1985 | Japan | 156/308.8 |
| 3251612 | 10/1988 | Japan | 403/268 |

OTHER PUBLICATIONS

Adhesives Handbook J. Shields pp. 67, 68 first published in 1970.

*Primary Examiner*—Andrew V. Kundrat
*Attorney, Agent, or Firm*—Terry M. Crellin

[57] ABSTRACT

A wooden dowel for insertion into aligned bores of two pieces of wood that are to be connected to each other. The dowel comprises a cylindrical piece of wood and a coating of water soluble glue covering the external surfaces of the cylindrical piece of wood.

11 Claims, 1 Drawing Sheet

DOWEL COATED WITH WATER SOLUBLE GLUE

BACKGROUND OF THE INVENTION

1. Field of the Invention

The present invention relates to wooden dowels that have a self-contained, integral coating of a water soluble glue on the external surface of the dowels.

2. State of the Art

In production of cabinets, furniture and other similar items from wood, adjoining pieces of wood are held securely together with wooden dowels. Dowel receiving cavities are formed in each of the respective pieces of wood that are to be held together. When the pieces of wood are assembled, liquid glue is injected into the dowel receiving cavities. To be sure that sufficient glue is used in each cavity an excess of glue is used in each cavity. When the dowel is inserted, glue is expelled from the cavity. The expelled glue creates a messy situation with glue getting on everything around the pieces of wood as well as on to the pieces of wood themselves. Cleaning of the glue is a major labor item and adds to the cost of the wood items being produced. However, manufacturers have found that the use of excess amounts of glue is essential. When the excess of glue is cut back, many of the dowel connections for one reason or another become weak due to insufficient or improper distribution of glue around the dowels in the cavities.

OBJECTIVES

A principal objective of the invention is to provide a novel dowel having an external coating of a water soluble glue. Then instead of introducing an excess of messy glue into the cavities in the wood pieces to be held together, manufacturers introduce water into the cavities. The dowels are then inserted into the cavities expelling excess water. The water does not constitute a messy problem like the expelling of excess glue from the cavities.

BRIEF DESCRIPTION OF THE INVENTION

The above objective is achieved in accordance with the present invention by providing a novel wooden dowel having a cylindrical shape that is received in snug fit in dowel receiving bores or cavities in the pieces of wood that are to be held together. The improved, novel dowel has a coating of a water soluble glue applied on the external surfaces thereof. Water is injected into the bore or cavity that the dowel is to be inserted. The glue coated dowel is then inserted into the bore or cavity containing the water and the water activates the glue coating on the dowel so that the dowel is securely and firmly adhered to the walls of the bore or cavity. It has been surprisingly found that exceptional strength is developed between the dowel and the bore or cavity into which the dowel is inserted when the dowel is coated with a water soluble glue and the bore or cavity has water injected thereinto prior to the insertion of the dowel into the bore or cavity.

Additional objects and features of the invention will become apparent from the following detailed description, taken together with the accompanying drawings.

THE DRAWINGS

A preferred embodiment of a dowel of the present invention representing the best mode presently contemplated of carrying out the invention is illustrated in the accompanying drawings in which FIG. 1 is a longitudinal cross section of the dowel with the external surfaces covered with a water soluble glue, and FIG. 2 is a transverse cross section taken along line 2—2 of FIG. 1.

DETAILED DESCRIPTION OF THE ILLUSTRATED EMBODIMENT

Figure 1:
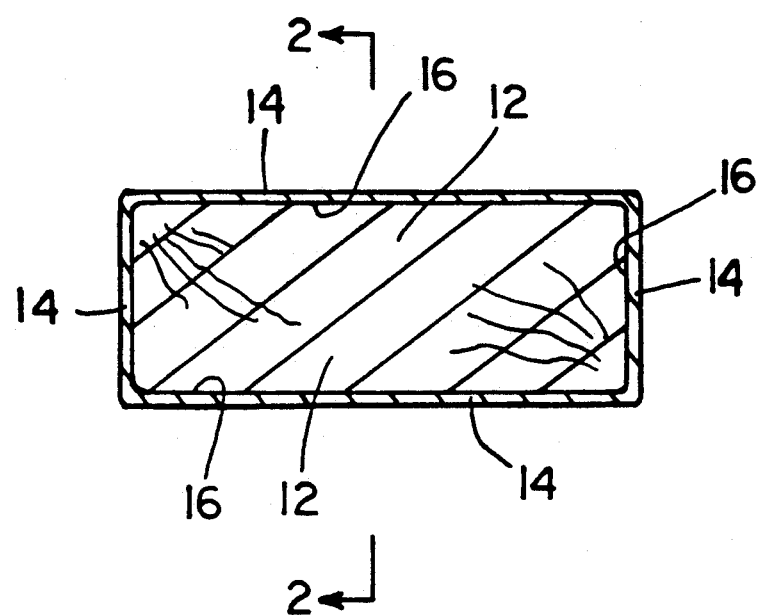
Figure 2:
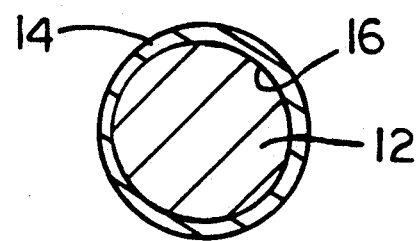

Referring to the drawings, an improved wooden dowel is shown which is adapted for insertion into aligned bores of two pieces of wood that are to be connected to each other. As illustrated in the drawings, the dowel comprises a cylindrical piece of wood 12 and a coating 14 of a water soluble glue covering the external surfaces 16 of the cylindrical piece of wood 12.

Preferably, the water soluble glue is applied in a substantially uniform coating 14 on the external surfaces 16 of the cylindrical piece of wood 14. The water soluble glue advantageously comprises a composition containing vinyl acetate homopolymer or polyvinyl acetate emulsion. An applicable vinyl acetate homopolymer is commercial available from H. B. Fuller Company in St. Paul, Minn., and the polyvinyl acetate emulsion is commercially available from Atwood Adhesives in Seattle, Wash.

The glue can be applied to the external surface 16 of the cylindrical piece of wood 12 by any method known and used in the art of applying a coating of liquid material to an item. Such coating methods include dipping, spraying, painting, roll coating, padding and other coating techniques.

In the novel use of the wooden dowels of the present invention, the precoated dowels are inserted into dowel receiving bores in pieces of wood that are to be held together. The method of using the precoated dowels comprises injecting water into the bores and then inserting dowels into the bores containing the injected water. The coating of water soluble glue on the external surfaces of the dowels is activated by the water in the bores to firmly and uniformly adhere the dowels to the internal surface of the bores.

It has been found that superior adhesion is achieved using the precoated dowels of the present invention as compared to prior art methods in which the glue is injected into the bores prior to the insertion of the dowels in the bores. The precoated dowels form a more uniform, stronger bond with the internal surface of the bores than do the same dowels used in the older prior art methods of injecting a liquid glue into the bores prior to insertion of the dowels into the bores. In addition, excess water that is ejected from the bores when the dowels are inserted does not present the extremely messy situation which occurs when excess liquid glue is ejected from the bores.

The dowels of the present invention are easily and inexpensively made by forming cylindrical pieces of wood and applying a coating of a water soluble glue on the external surfaces of the cylindrical pieces of wood.

Although preferred embodiments of the present invention have been illustrated and described, it is to be understood that the present disclosure is made by way of example and that various other embodiments are possible without departing from the subject matter coming within the scope of the following claims, which subject matter is regarded as the invention.

I claim:

1. An improved wooden dowel for insertion into aligned bores of two pieces of wood that are to be connected to each other, said dowel comprising
   a cylindrical piece of wood; and
   a coating of a water soluble glue covering the external surfaces of the cylindrical piece of wood.

2. A wooden dowel in accordance with claim 1, wherein the water soluble glue is applied in a substantially uniform coating on the external surfaces of the cylindrical piece of wood.

3. A wooden dowel in accordance with claim 1, wherein the water soluble glue comprises a composition containing vinyl acetate homopolymer.

4. A wooden dowel in accordance with claim 1, wherein the water soluble glue comprises a composition containing polyvinyl acetate emulsion.

5. A method of inserting wooden dowels into dowel receiving bores of pieces of wood that are to be held together, said method comprising
   injecting water into the bores; and
   inserting dowels into the bores containing the injected water, wherein the dowels have a coating of water soluble glue on the external surfaces of the dowels.

6. A method in accordance with claim 5, wherein the water soluble glue forms a substantially uniform coating on the external surfaces of the dowel.

7. A method in accordance with claim 5, wherein the water soluble glue comprises a composition containing vinyl acetate homopolymer.

8. A method in accordance with claim 5, wherein the water soluble glue comprises a composition containing polyvinyl acetate emulsion.

9. A method of making wooden dowels comprising
   forming cylindrical pieces of wood; and
   applying a coating of a water soluble glue on the external surfaces of the cylindrical pieces of wood.

10. A method in accordance with claim 9, wherein the water soluble glue comprises a composition containing vinyl acetate homopolymer.

11. A method in accordance with claim 9, wherein the water soluble glue comprises a composition containing polyvinyl acetate emulsion.

* * * * *